VIDEO BLANKING AND SYNC PULSE INSERTION CIRCUIT

Filed Aug. 21, 1967 2 Sheets-Sheet 1

INVENTORS A. M. GORDON
W. THOMMEN
BY Daniel D. Dubosky
ATTORNEY

Dec. 30, 1969 A. M. GORDON ET AL 3,487,162

VIDEO BLANKING AND SYNC PULSE INSERTION CIRCUIT

Filed Aug. 21, 1967 2 Sheets-Sheet 2

United States Patent Office 3,487,162

Patented Dec. 30, 1969

3,487,162

VIDEO BLANKING AND SYNC PULSE INSERTION CIRCUIT

Alan M. Gordon, Matawan Township, Monmouth County, and Werner Thommen, Marlboro Township, Monmouth County, N.J., assignors to Bell Telephone Laboratories, Incorporated, Murray Hill and Berkeley Heights, N.J., a corporation of New York Filed Aug. 21, 1967, Ser. No. 661,965

Int. Cl. H04n *3/16*

U.S. Cl. 178—7.1 10 Claims

ABSTRACT OF THE DISCLOSURE

A blanking level is produced in a clamped video signal from a television camera in response to a blanking pulse by opening a first transistor switch connected in the emitter path of a trannsistor common emitter amplifier configuration thereby causing the amplifying transistor to be turned off. This blanking level at the output of the amplifying transistor is established at the divider point of a voltage divider connected to ground through a second transistor switch. By opening this second switch in response to a synchronization pulse, a voltage sync pulse is produced at the output. A clipping circuit for limiting large white level excursions in the video signal is connected to the collector. In a second embodiment, two video signals are combined with blanking and synchronization pulses in a circuit having two transistor amplifiers connected to the first and second switches.

BACKGROUND OF THE INVENTION

This invention relates to electrical signal mixing circuits and more particularly to circuits for combining video signals with associated blanking and synchronization pulses.

A standard composite television video signal contains segments of signal representing the video information obtained from a camera during each scanning line separated by a blanking "pedestal" representing black level on which there is superimposed a synchronization pulse of shorter duration than the blanking pulse, thereby producing a "front and back porch" immediately preceding and following the synchronized pulse. Many successful vacuum tube circuits for generating this type of composite video signal have been described in the prior art. Some difficulty has been experienced, however, when transistors are substituted for vacuum tubes in these prior art circuits in attempting to provide a transistorized signal mixing circuit for use in the transmitter of a visual telephone set. One difficulty which has been encountered is related to the large voltage excursions which exist during the retrace interval in the video signal prior to its being combined with the blanking and synchronization pulses. Specifically, application of this video signal to the usual transistor amplifier can cause breakdown of the base-emitter junction of the transistor contained therein during these large voltage excursions.

Accordingly, an object of the present invention is to produce a composite video signal by combining a video signal with blanking and synchronization pulses in a circuit utilizing only transistors and resistors so that the circuit can be realized as a monolithic integrated chip.

Another object is to produce this composite video signal in an electrical signal mixing circuit which utilizes a minimum number of circuit elements, thereby resulting in a minimum cost and maximum reliability both of which are essential for all circuits used in visual telephone sets.

SUMMARY OF THE INVENTION

According to this invention, a first transistor is connected in a common emitter amplifier configuration with a clamped video signal applied to its base, an output signal developed across a resistor connected in its collector path, and its emitter path series connected with a second normally saturated switching transistor. The second transistor is driven out of conduction by blanking pulses applied to its base, thereby causing the first amplifying transistor to be taken out of conduction during the blanking pulse interval and preventing the video signal from appearing across the output resistor. From the output resistor a second resistor is connected to the collector of a third normally saturated switching transistor, the emitter of which is connected to ground potential. This results in a voltage drop across the output resistor which is equal to the difference between the blanking and sync level. The third transistor is driven out of conduction by the synchronization pulses thereby removing the voltage drop across the output resistor and causing the output to rise to the sync pulse level. By opening the emitter path rather than back-biasing the base-emitter junction of the amplifying transistor during the blanking pulse interval, the high level video signals present at the base during the retrace interval are not able to cause breakdown of the base-emitter junction.

One feature of the present invention is that a second video signal may be combined with the blanking and synchronization pulse in order to produce a second composite video signal with the addition of a single transistor and several resistors to the basic circuit. Additional video signals may be added in the same way. As a result, a bar pattern video signal useful for alignment or other system purposes may easily be generated in each of the visual telephone transmitting sets utilizing the present invention.

BRIEF DESCRIPTION OF THE DRAWING

Other objects and many attendant advantages of the invention will be readily apparent after reading the following description in conjunction with the accompanying drawings in which.

DETAILED DESCRIPTION

Figure 1:
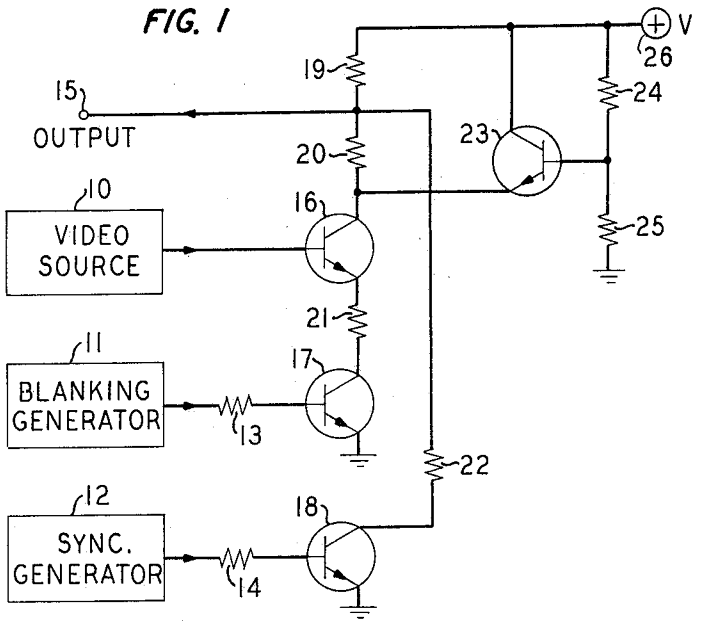
FIG. 1 is a schematic drawing of one embodiment of the present invention.
Figure 2:
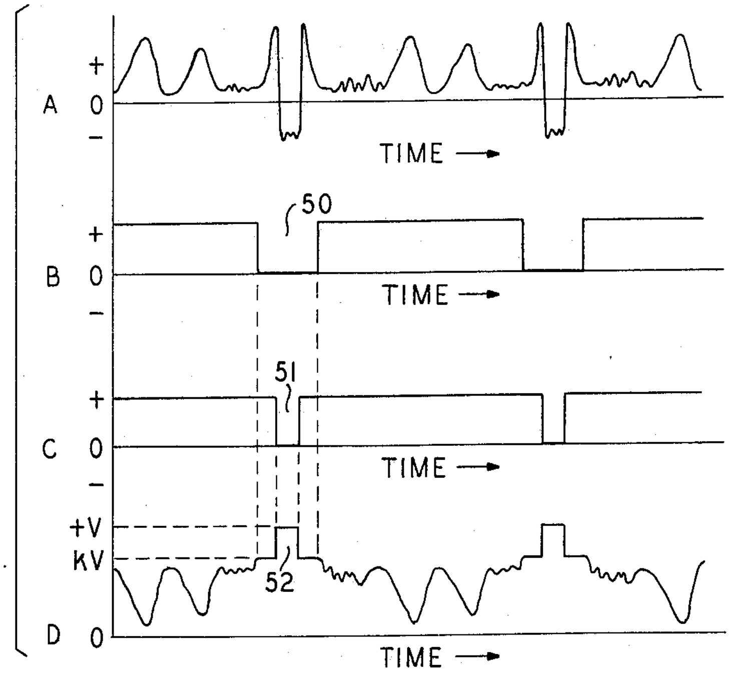
FIG. 2 is a set of voltage waveforms useful in explaining the operation of the embodiment shown in FIG. 1.

In FIG. 1, a clamped video signal which is to be combined with blanking and synchronization pulses is generated in a video source 10 and coupled to the base of a transistor 16. Video source 10 may be any of a wide variety of video signal generating circuits which include a television camera, such as, for example, a vidicon, or may be the generator of any other type signal with which it is desired to combine recurrent pulses. A portion of the voltage waveform of a representative video signal available from a vidicon camera tube circuit is shown in FIG. 2A. It will be assumed that the video signal shown in FIG. 2A and applied to the base of transistor 16 has been phased in video source 10 such that a positive excursion indicates an increase in the brightness of a scene, and, in addition, has been clamped relative to ground such that the black level produces at the output the same voltage level as the blanking level to be developed in a circuit as described hereinafter.

Transistor 16 is connected in a common emitter amplifier configuration with a resistor 21 connected between the emitter of transistor 16 and the collector of a transistor 17 whose emitter is connected to ground potential. Since a blanking generator 11, during the time other than during the blanking pulse interval, couples a positive potential with respect to ground through a current limiting resistor 13 to the base of transistor 17, transistor 17 during this time is in saturation providing a very low impedance between resistor 21 and ground. Hence at times other than during the blanking pulse interval, transistor 16 performs in the same way as a standard common emitter amplifier in producing an amplified replica at its collector of the signal presented to its base electrode.

The collector of transistor 16 is connected through a resistor 20 and a resistor 19 to a positive potential source 26. The collector of transistor 16 is also connected to the emitter of a transistor 23 whose collector is connected to potential source 26 and whose base is connected to a potential divider composed of resistors 24 and 25 connected between potential source 26 and ground. Transistor 23 and the resistors 24 and 25 provide an economical arrangement, requiring low stand-by power, for limiting the video signal in the white level direction. The values of resistors 24 and 25 are chosen so that for the usual values of video signal presented to the base of transistor 16, transistor 23 is not in conduction, and the collector of transistor 16 is free to assume whatever potential is dictated by the video signal applied to its base. If however the video signal from source 10 should contain a large positive voltage excursion beyond the maximum white level which is desired, the collector of transistor 16 during this large voltage excursion drops to a potential at which transistor 23 conducts and thereby clamps the potential at the collector of transistor 16 to the predetermined potential established by the potential divider formed by resistors 24 and 25.

In order to provide effective white level limiting, the impedance presented to the collector of transistor 16 by the limiting circuit utilizing transistor 23 should be maintained as low as possible. By using transistor 23 rather than a diode between the collector of transistor 16 and the potential divider, much higher resistor values may be chosen for the potential divider and therefore much less power is dissipated in the circuit.

Although the amplified video signal available at the collector of transistor 16 is caused to operate effectively with the white level limiting circuit utilizing transistor 23, this amplified level of video signal may not be the desired level to be coupled to subsequent stages. Accordingly, output terminal 15 is connected to the junction of resistors 19 and 20 whose values are proportioned (with a consideration of resistor 22 to be described hereinafter) in order to obtain the desired amplified level of video signal at output terminal 15 with respect to ground.

Also connected to the junction of resistors 19 and 20 is one end of a resistor 22, the other end of which is connected to the collector of a transistor 18, the emitter of which is connected to ground. At times other than during the synchronization pulse interval, a synchronization pulse generator 12 couples a positive potential through a current limiting resistor 14 to the base of transistor 18, and therefore transistor 18 is usually in saturation, thereby clamping the other end of resistor 22 to ground.

During an interval enclosing the retrace time in the signal from video source 10, a negative-going blanking pulse 50 is generated by blanking pulse generator 11 as shown in FIG. 2B, transistor 17 is taken out of conduction by this negative-going voltage pulse presented to its base, the emitter path to ground for transistor 16 is opened, and therefor transistor 16 is taken out of conduction. Accordingly, the video signals presented to the base of transistor 16 are not amplified during the blanking pulse interval, and the potential at output terminal 15 rises to and is clamped at a value of $kV$ as shown in FIG. 2D, where V is the value of the potential from positive potential source 26 and $k$ is a fraction less than 1 determined primarily by the voltage divider composed of resistors 19 and 22. This potential value of $kV$ at output terminal 15 corresponds to the abovementioned blanking level.

Only a fraction of the blanking pulse waveform is indicated in FIG. 2B. In most cases it comprises both horizontal line pulses and interspersed field pulses arranged according to the requirements of the television system in which the circut is to be used.

A short predetermined interval (equal to the desired duration of the "front porch") after the blanking pulse 50 has been initiated, a negative-going synchronization pulse 51 is generated by sync pulse generator 12 as shown in FIG. 2C and coupled through resistor 14 to the base of transistor 18. This negative-going voltage pulse 51 drives transistor 18 out of conduction thereby causing the path through resistor 22 to ground to be opened. As a result, during the synchronization pulse 51 interval, the potential divider consisting of resistors 19 and 22 is not effective as such and therefore the potential at output terminal 15 is permitted to rise to substantially the full value V of positive potential source 26 as shown in FIG. 2D thereby forming a sync pulse 52 above the blanking level of $kV$.

Like the blanking pulse waveform of FIG. 2B, only a fraction of the synchronization pulse waveform is shown in FIG. 2C. It usually comprises both line and frame synchronization pulses, the intervals during which the sync pulses occur always lying wholly within the intervals during which the blanking pulses occur.

When synchronization pulse 51 is terminated, transistor 18 is driven back into saturation and the potential at output terminal 15 is caused to return to the value of $kV$ as shown in FIG. 2D thereby terminating sync pulse 52. A predetermined interval (equal to the desired duration of the "back porch") after synchronization pulse 51 has been terminated, blanking pulse 50 is terminated, transistor 17 is driven back into saturation and transistor 16 resumes its action as a common emitter amplifier of the video signals presented to its base by video source 10.

Figure 3:
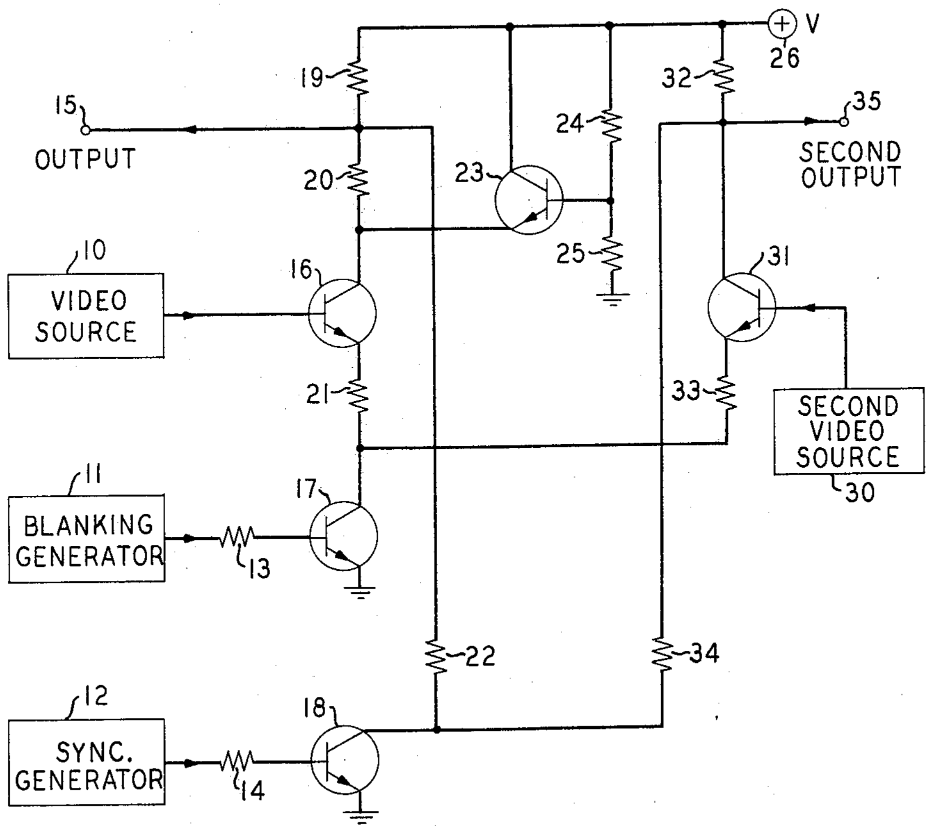
FIG. 3 is a schematic drawing of a combination utilizing the embodiment shown in FIG. 1.

In FIG. 3, a circuit is shown for combining two video signals with the blanking and synchronization pulses from generators 11 and 12. This circuit is especially useful in a video telephone set for providing a bar patterned video signal in addition to the video signal obtained from the television camera. The video signal required to develop a bar pattern can easily be generated by circuitry which responds to synchronizing pulses present in the video telephone transmitting set. Like the video signal available from the camera, however, this bar patterned video signal must still be combined with blanking and synchronization pulses before transmission to a remote receiver. The circuit of FIG. 3 combine both the video signal from a camera and a second video signal with blanking and synchronization pulses in order to provide two composite video signals, either of which may be selected for transmission to the remote receiver.

In FIG. 3, the second video signal from the second video source 30 is coupled to the base of a transistor 31 which is connected in a common emitter amplifier arrangement having a resistor 33 connected between its emitter and the collector of transistor 17. All of the elements shown in FIG. 3 bearing identical numbers to those shown in FIG. 1 perform in identically the same way as discussed hereinabove in connection with FIG. 1. The collector of transistor 31 is connected through a resistor 32 to positive potential source 26 and through a resistor 34 to the collector of transistor 18.

Assuming that the signal from source 30 is the type which is electrically generated to form a bar pattern, such a signal is predictable in nature and has no large unexpected excursions beyond the permissible maximum white level. Therefore no white level limiting circuit of the type provided for the transistor 16 amplifier is necessary in connection with transistor 31, and the value of resistor 32 may be chosen to provide the desired output level of video signal at the second output terminal 35 which is connected directly to the collector of transistor 31.

In all other respects besides white level limiting, transistor 31 operates in identically the same fashion as described hereinabove in connection with transistor 16 to introduce a blanking level and synchronization pulse at recurrent intervals into the signal provided by second video source 30. During blanking pulse 50 from generator 11, transistor 31 is taken out of conduction since its emitter path through resistor 33 is opened, and the collector of transistor 31 is caused to rise to a blanking level determined by the voltage divider composed of resistors 32 and 34. During the synchronization pulse 51 from generator 12, the path to ground through resistor 34 is opened and the potential at the collector of transistor 31 is caused to rise to substantially the full potential of potential source 26.

What has been described hereinabove is a specific illustrative embodiment of the present invention. As will be readily apparent to those skilled in the art, many modifications and alterations may be made without departing from the spirit and scope of the present invention. For example, if the video signal from second video source 30 is the type which may contain large excursion beyond the maximum permitted white level, a second white level limiting circuit, of the type described hereinabove utilizing transistor 23, may be connected to the collector of transistor 31. In addition, opposite types of transistors may be submitted for those shown providing changes are also made in polarities of both the potential source and the signals coupled to the circuit.

What is claimed is:

1. A mixing circuit for combining a video signal wth blanking and synchronization pulses into a single composite signal having recurrent blanking levels within which a sync pulse occurs, said circuit comprising a transistor having base, emitter, and collector electrodes connected in a common emitter amplifier configuration having an emitter path and a collector load, means for applying said video signal to the base of said transistor, a switching means normally in conduction and operative to its out of conduction state in response to said blanking pulses, means for series connecting said switching means in the emitter path of said transistor whereby the emitter path is opened during the blanking pulse interval, and means for developing a sync pulse at said collector load in response to each of said synchronization pulses.

2. A mixing circuit as defined in claim 1 wherein said emitter path includes a resistor having one end connected to said emitter electrode and the other end connected through a second normally conducting transistor to ground.

3. A mixing circuit as defined in claim 2 wherein said means for developing a sync pulse includes a second and third resistor connected in series as a voltage divider with one end connected to a potential source and the other end connected through a third normally conducting transistor to ground, means for connecting the collector electrode of said amplifying transistor to the junction of said second and third resistors, and means for driving said third transistor out of conduction in response to said synchronization pulses, thereby removing the effect of said voltage divider on the potential at said junction during the synchronization pulse interval.

4. A mixing circuit as defined in claim 3 wherein said means for connecting said collector electrode to said junction point of said second and third resistors includes a fourth and fifth resistor connected as a potential divider between said potential source and ground, and a unidirectional semiconductor device connected between said collector electrode and the junction of said fourth and fifth resistors, whereby said collector electrode is clamped to the potential established at the junction of said potential divider when said video signal exceeds a predetermined permissible white level.

5. In a circuit for producing a composite video signal by combining a video signal with blanking and synchronization pulses, a transistor having a base, emitter, and collector electrodes, means for applying said video signal to said base electrode, a collector path connected between said collector electrode and ground potential across which collector path amplified replicas of segments of said video signal are developed, and an emitter path connected between said emitter electrode and ground potential; said emitter path comprising an impedance series connected with a normally conducting switching means, and means for driving said switching means out of conduction in response to said blanking pulses, whereby said emitter path is opened during the interval of said blanking pulse and a large voltage excursion in said video signal during said blanking pulse interval is unable to produce a large back bias potential across the base-emitter junction of said transistor.

6. In a circuit as defined in claim 5 wherein said collector path includes second and third impedances series connected through a second normally conducting switching means across a potential source, means for connecting said collector electrode to the junction of said second and third impedances, and means for driving said second switching means out of conduction in response to said synchronization pulses, whereby a voltage pulse is produced at said junction during each synchronization pulse interval.

7. In a circuit as defined in claim 6 wherein said collector path further includes fourth and fifth impedances series connected across said potential source, and a unidirectional semiconductor device connected between the junction of said fourth and fifth impedances and said collector electrode, whereby said unidirectional semiconductor device conducts and thereby clamps said collector electrode to the potential at said last-mentioned junction during instants when voltage excursions in said video signal exceed a predetermined level.

8. A mixing circuit for combining first and second video signals with blanking and synchronization pulses in order to produce first and second composite video signals comprising in combination, a first and second transistor each having a base, emitter, and collector electrodes, means for coupling said first video signal to the base of said transistor, means for coupling said second video signal to the base of said second transistor, first and second impedance means for coupling the collector electrodes of said first and second transistors respectively to a source of potential, a normally conducting switching means for providing a high open-circuit impedance in response to each of said blanking pulses, a first resistance means having one end connected to the emitter of said first transistor and the other end connected through said switching means to ground, a second resistance means having one end connected to the emitter of said second transistor and the other end connected through said switching means to ground, and means for developing a voltage pulse in each of said first and second impedance means during each of said synchronization pulses.

9. A mixing circuit as defined in claim 8 wherein said means for developing a voltage pulse in each of said first and second impedance means includes a second normally conducting switching means operative to a high open-circuit impedance in response to each of said synchronization pulses.

10. A mixing circuit as defined in claim 9 wherein at least one of said first and second impedance means includes a potential divider connected across said source of potential, and a third transistor having its base connected to said potential divider at the point of divided potential, its collector connected to said source of potential, and its emitter connected to the collector electrode associated with said at least one of said first and second impedances.

References Cited

UNITED STATES PATENTS 3,389,220 6/1968 Buzan ............. 178—7.1

RICHARD MURRAY, Primary Examiner

ROBERT L. RICHARDSON, Assistant Examiner